May 19, 1970   J. L. JONES, SR   3,512,530
MULTIPLE PLY SANITARY NAPKIN WITH REGENERATED CELLULOSE SPONGE
Filed Oct. 16, 1967   2 Sheets-Sheet 1

INVENTOR
John Leslie Jones, Sr.

May 19, 1970            J. L. JONES, SR           3,512,530
MULTIPLE PLY SANITARY NAPKIN WITH REGENERATED CELLULOSE SPONGE
Filed Oct. 16, 1967                                           2 Sheets-Sheet 2
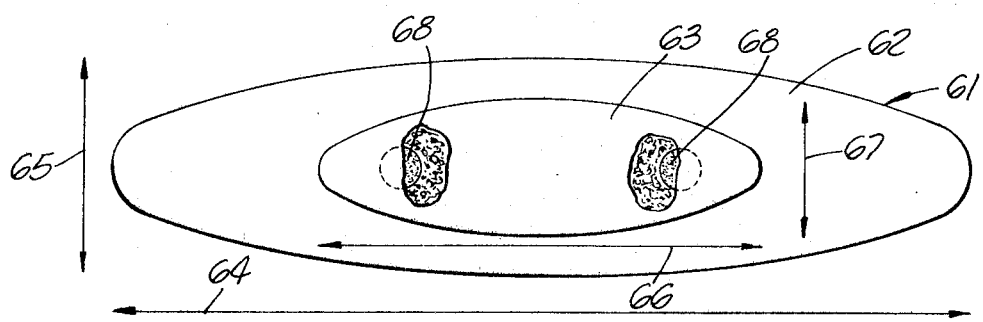
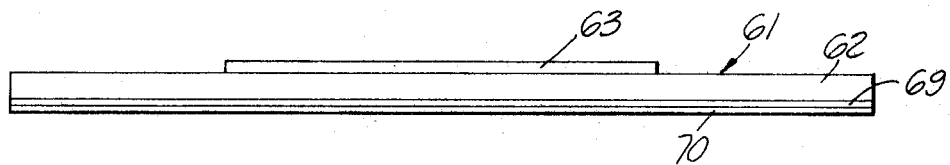
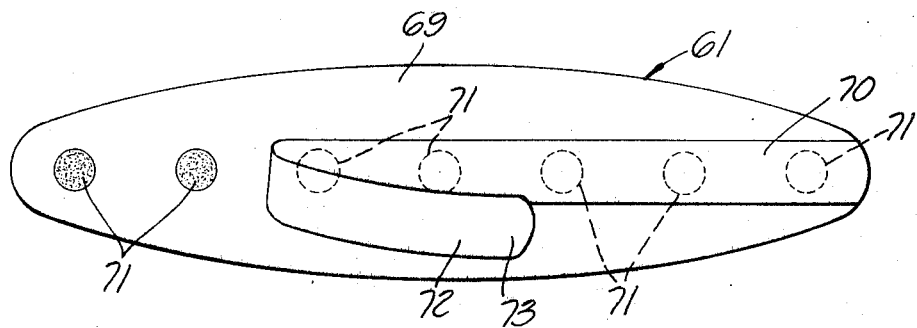
INVENTOR.

3,512,530
MULTIPLE PLY SANITARY NAPKIN WITH
REGENERATED CELLULOSE SPONGE
John Leslie Jones, Sr., 1070 Glen Oaks Blvd.,
Pasadena, Calif. 91105
Filed Oct. 16, 1967, Ser. No. 675,556
Int. Cl. A61f 13/18
U.S. Cl. 128—290       7 Claims

ABSTRACT OF THE DISCLOSURE

This invention teaches a single use, multiple ply, menstrual sanitary napkin, the multiple plies being adhesively bonded together. A regenerated cellulose or viscose cellulose sponge layer, uniformly compressed, in the one dimension normal to the nomal absorbtive napkin surface, to minimum pore size openings, constitutes the inner, shaped, menstrual fluid absorbent layer. Outward from this cellulose sponge layer is an adhesive fluid resistant layer which acts to bond the cellulose sponge layer to a larger cellulosic non-woven felted ply area. In turn the felted ply area is bonded on its other planar surface to a thin flexible high wet strength ply. A thin pressure sensitive adhesive layer with a release sheet forms the outermost layer of the napkin and acts as a means to attach it to the sanitary belt of a user. The non-woven felted ply area acts as a secondary or back up absorber for the cellulose sponge layer which is in contact with the user. The adhesive layer between the sponge layer and felted ply layer is formed by a long narrow adhesive bond so as not to retard the flow of fluids therebetween.

Included in the objects of this invention are:

First, to provide a dry, single use, very compact thickness, menstrual sanitary napkin.

Second, to provide a multiple ply thickness of a menstrual sanitary napkin which is storable in a commercial package as a very thin napkin, compared to other commercially available products of equivalent absorption usefulness.

Third, to provide a single use, menstrual sanitary napkin having a regenerated cellulose or viscose cellulose sponge, compacted, inner absorbent layer particularly highly absorbent for menstrual fluid.

Fourth, to provide a single use, menstrual sanitary napkin having a plurality of layers adhesively bonded to other, and an adhesive means of bonding the napkin to a fluid impermeable napkin holder or sanitary napkin belt.

Fifth, to provide a single use, menstrual sanitary napkin having an integral fluid resistant shield adjacent the exterior surface of the napkin, preventing menstrual fluid leakage during the napkin use.

Further objects and advantages of this invention will become apparent in the following description, to be read in connection with the accompanying drawings.

FIG. 6 is a plan view of one face of a second modification of a sanitary napkin of this invention.

FIG. 7 is an exterior elevational view of the sanitary napkin of FIG. 6.

FIG. 8 is the obverse plan view of the sanitary napkin of FIG. 6.

Figure 1:
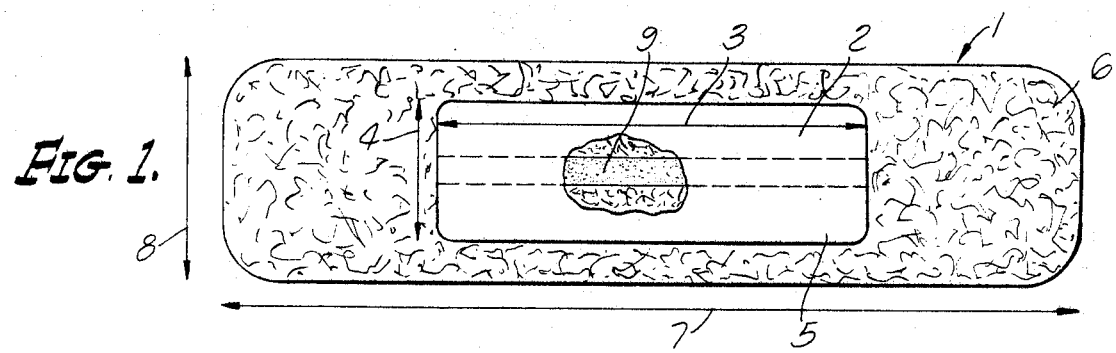
FIG. 1 is a plan view of one face of one modification of the improved menstrual sanitary napkin, with a partial sectional view.

Referring to FIG. 1 in detail, a plan view of the absorptive face of the menstrual sanitary napkin 1 is shown. The dry, regenerated cellulose, fine pore, planar sponge volume ply 2 has a major axis 3 and a minor axis 4. The planar face 5 of the sponge volume ply area 2 is shown contiguously parallel to the cellulose, fibrous, non-woven felted ply area 6. The felted ply area 6 has a major axis 7 and a minor axis 8. The relatively narrow strip of thin, menstrual fluid resistant adhesive layer area 9 is shown in a partial sectional view through the sponge volume ply area 2. The narrow adhesive layer area 9 extends the length of the planar face 5, bonding the sponge volume ply area 2 and the felted ply area 6 together.

Figure 2:
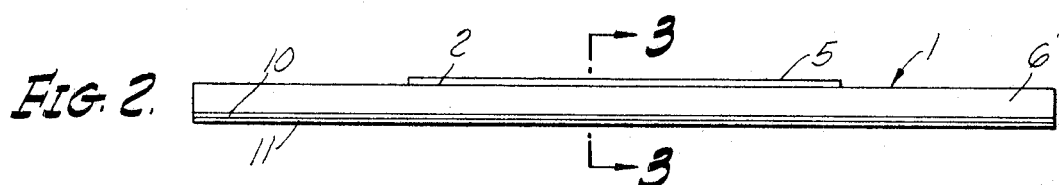
FIG. 2 is an exterior elevational view of the sanitary napkin of FIG. 1.

In FIG. 2, the compressed nature of the dry, regenerated cellulose or viscose cellulose, fine pore, planar sponge volume ply area 2 is clearly shown. The dry planar sponge volume 2 has been compressed in the napkin structure as shown, from an original approximately ⅜ inch thickness to about $\frac{3}{64}$ inch thickness, minimizing the sponge pore size openings. The sponge volume ply area 2 is concentrically located on the felted ply area 6, with the intersection of its major and minor axes 3 and 4, located along the major axis 7 of the felted ply area 6 which bisects the minor axis 8. The intersection of axes 3 and 4 can be nonconcentric with the intersection of axes 7 and 8. It is the function of the compressed sponge volume 2 to provide the major absorption volume for the menstrual fluid. It is also very important from the user's viewpoint that the napkin occupy a minimum storage volume until the napkin is in use. Typically the planar compressed sponge ply volume increases 8-fold on wetting by menstrual fluid and expansion.

Further in FIG. 2, the high wet-strength ply 10 is shown secured to the felted ply area 6, being adjacently parallel and bonded to the face of the felted ply 6 opposite the face to which the compressed sponge volume ply area 2 is bonded. A release coated thin flexible sheet 11 is shown as the next visible layer in the multiple laminated sanitary napkin structure, being secured as a removable protective covering for a thin pressure sensitive adhesive layer not visible.

Figure 3:
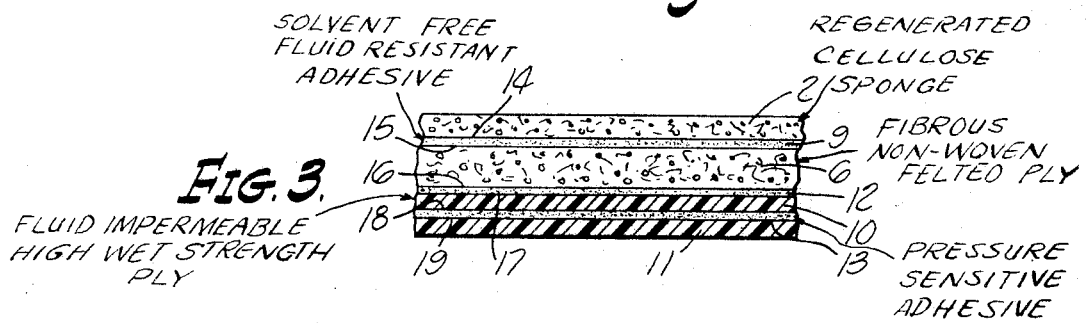
FIG. 3 is a cross sectional view through 3—3 of FIG. 2 illustrating the detailed laminated sanitary structure.

In FIG. 3 there is shown clearly the multiple layers of this laminated sanitary napkin structure taken through cross section 3—3 of FIG. 2. The drawing of FIG. 3 does not strictly show the multiple plies of the laminated structure in correct thickness proportions, the thinner plies must be shown on an exaggerated scale in the small size drawing space. This lack of drawing space must also be compensated for in the other figures by showing the thinner plies on an exaggerated, enlarged scale. The dry, regenerated cellulose, fine pore planar sponge volume ply area 2 is shown compressed to minimum pore size openings in the plane normal to its rectangular area as shown in FIG. 1, and the ply area 2 is bonded by the high melting fluid resistant adhesive layer area 9 to the cellulose, fibrous, non-woven felted ply area 6. The felted ply area 6 is in turn continuously secured by a bond layer 12 to the thin flexible high wet-strength ply 10. The thin flexible high wet-strength ply 10 has a thin pressure sensitive adhesive layer 13 secured to it. A release coated thin flexible sheet 11 covers one face of the adhesive layer 13, the release coated face being adjacent the layer 13.

Thus, the adhesive layer 9 adheres one face 14 of the planar compressed sponge volume ply area 2 to the first face 15 of the felted ply area 6. The second face 16 of the felted ply area 6 is continuously adhered by the bond layer 12 to the first face 17 of the thin, flexible high wet-strength ply 10. The interface 18 represents the bonding of the first face of the thin pressure sensitive adhesive layer 13 and the second face of the high wet-strength ply 10. The second face of the thin pressure sensitive adhesive layer 13 and the release coated face of the thin flexible release sheet 11 are located at the interface 19.

Figure 4:
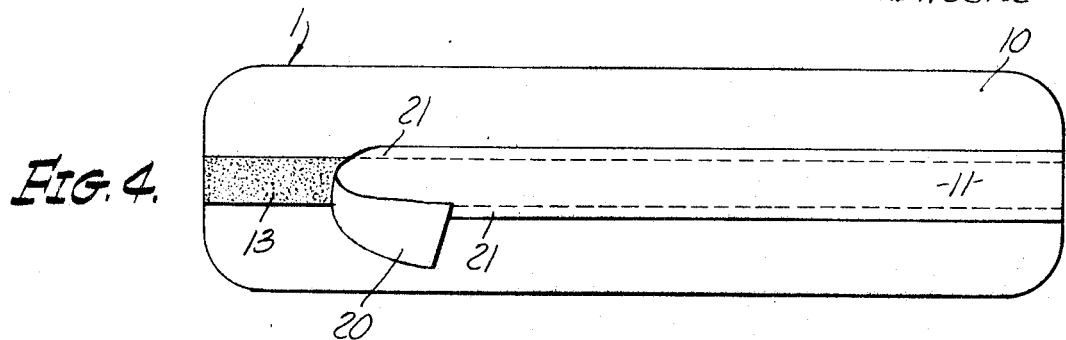
FIG. 4 is an obverse plan view of the sanitary napkin of FIG. 1.

FIG. 4 illustrates the details of the obverse side of the sanitary napkin 1, opposite the absorbent side view of FIG. 1. The thin, flexible high wet-strength ply area 10 is shown to be coextensive in area with the felt ply area 6. The narrow continuous strip of thin, flexible pressure sensitive adhesive layer 13 is shown permanently secured to the face opposite the first face 17 of the ply 10. The release sheet area strip 11 is shown partially removed from the adhesive layer 13 at the end 20. The adhesive layer 13 extends the full length of the major axis 7 and is fully protected during storage prior to use by the release sheet area strip 11. The strip area 11 is moderately wider than the adhesive layer 15 strip area, providing unadhered strip handles 21 on both outer edges of the strip 11, useful for easy removal of the strip area 11 from the adhesive layer area 13 at time of use of the napkin 1.

Figure 5:
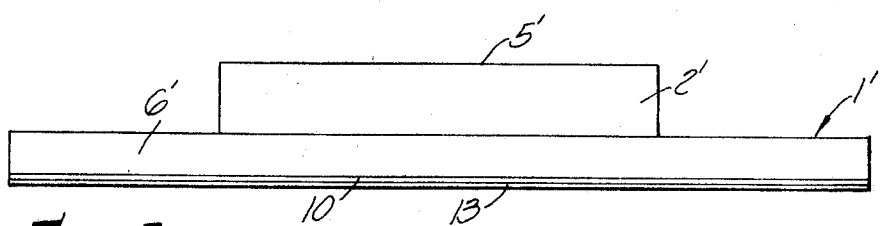
FIG. 5 is a modified exterior elevational view of the sanitary napkin of FIG. 2 after the napkin has been used to absorb menstrual fluid.

In FIG. 5 are shown details of sanitary napkin 1' wherein the napkin 1 has been modified by use as a menstrual fluid absorption device. The elevational view similar to FIG. 2 shows a wet, expanded regenerated cellulose, fine pore sponge volume 2', which has expanded to approximately eight times its compressed thickness as illustrated in FIG. 2, as a result of menstrual fluid absorption and wetting of ply area 2. The surface 5' was the surface of the napkin 1' most closely applied to the vaginal opening. Due to the narrow, minor width of the adhesive layer 9 as compared to the minor axis width 4 of the sponge ply volume 2', the menstrual fluid absorbed by the expanded sponge volume 2' can wick through and be imbibed by the unadhered and contiguous felted ply area 6', providing a further reserve of cellulosic structure absorbing and holding menstrual fluid. It is desirable to keep the adhesive strip area 9 as narrow as possible, consistent with secure adherence of sponge ply volume 2' to felted ply area 6', to facilitate ready absorption by ply area 6' by transfer from sponge volume 2'. The menstrual fluid resistant, high wet-strength ply area 10 serves to provide a stress membrane ply for the combined cellulosic absorptive structures 2 and 6. Ply area 10 also provides a base for the adhesive layer strip 13 which adheres the napkin 1 to a sanitary belt during use of the napkin as a menstrual fluid absorbent. By readily stripping off the protective release sheet area strip 11, using fingertips and finger nails on the unadhered strip handles 21, the adhesive layer strip 13 is quickly made ready for adhering to a sanitary belt.

The bond layer 12 represents two equivalent structures. In one structure the bond layer 12 can represent a layer of contact cement continuously and completely spread over the first face 17 of the high wet-strength ply area 10, and to which layer 12 the felted ply area 6 is applied for contiguous bonding. In the second equivalent structure the high wet-strength ply area 10 is a thermoplastic thin film which is thermally sealed to the felted ply area 6 by one of several conventional methods to form a bond layer 12, which combines 10 and 6.

In FIGS. 6, 7 and 8 are collectively shown another menstrual sanitary napkin 61 as a further modification of this invention. The napkin 61 is elliptical shaped as shown in the plan view of FIG. 6. Both the cellulosic, fibrous, non-woven felted ply area 62 and the dry, regenerated cellulose, fine pore planar sponge volume ply area 63 are shown concentrically located on their centers of their major and minor axes. The center of the major axis 64 and the minor axis 65 of the elliptical shaped felted ply area 62 does not necessarily coincide with the center of the major axis 66 and the minor axis 67 of the elliptical shaped compressed sponge ply area 63, but can be so placed. Two circular, menstrual fluid resistant, thin, adhesive layer areas 68 are shown plied between the compressed sponge volume planar ply area 63 and the felted ply area 62, bonding the two absorptive layers together. The adhesive layers 68 are located at the opposite ends of the ply area 63, providing secure bonding of the two absorptive layer areas 62 and 63, with ample contact area between 62 and 63 for wicking and migration of absorbed menstrual fluid.

In FIG. 7 the side elevational view of the napkin 61 shows a highly compressed, dry, regenerated cellulose sponge volume ply area 63 concentrically secured on the elliptical felted ply area 62. The menstrual fluid impermeable ply area 69 is shown coplanarly bonded adjacent the felt ply area 62. The release coated, thin flexible sheet area 70 is shown as the last, outward ply laminate of this napkin 61 modification.

The obverse side of the napkin 61 is shown in FIG. 8, being the non-absorptive side of the napkin opposite the absorptive faces of 62 and 63. The menstrual fluid impermeable ply area 69 is shown and it is coplanarly bonded to the felted ply area 62, completely covering the same elliptical area. The multiple circular, thin, pressure sensitive adhesive layer areas 71 are shown in a regularly spaced line array along the major axis 64 of the napkin 61. The strip of release coated thin flexible sheet area 70 is shown covering the multiple circular adhesive layer areas 71, a strip portion 72 being removed from a portion of the multiplictiy 71, and showing the release coated face 73. In storage the strip area 70 extends completely along the major axis 64.

The improved sanitary napkin of this invention is made in the size dimensions necessary for female use. The elliptical napkin shape of FIGS. 6, 7 and 8 are preferred in view of the female anatomy, and in addition, the elliptical planar compressed sponge volume ply area 63 may be combined with the rectangular felted ply area 6 of FIGS. 1, 2 and 4. Typically the compressed sponge volume ply areas 2 and 63 have major axes 3 and 66 respectively which can be 2 to 4 inches long, or the like, and minor axes 4 and 67 respectively, which can be 1 to 2 inches wide, or the like. The compressed sponge volume planar areas 2 and 63, or the like, can be located along the major axes 7 and 64, or the like, bisecting the respective minor axes 8 and 65, or the like. The precise position of 2 and 63, or the like, along the axes 7 and 64, or the like, is that most suited to the anatomical requirements for the sanitary napkin product.

The thickness of the extended dry, sponge volume, corresponding to 5', can typically be ¼ to ½ inch. The dry, extended sponge density is typically 0.06 g./cc., or the like. The felt ply can be described as a cellulosic, unwoven, fibrous felted sheeted ply of disintegrated, bleached wood pulp fibers, regenerated cellulose or rayon fibers, or cotton fibers, and can typically have a weight per unit area range of 0.2 to 0.08 g./sq. in. or the like. The high wet-strength ply 10 and 69 is typically a thin, thermoplastic film of polyethylene, polypropylene, highly plasticized vinyl chloride, or the like, providing a very soft feel to the skin and being pliable at body temperature.

Typically the thin film ply can be .00200 to 0.005 inch thickness, or the like, the film being sufficiently strong to support the remainder of the napkin structure. The film ply must permit the napkins to be adhesively bonded by the pressure sensitive adhesive layers 9 and 71 and the like to sanitary napkin belts during the napkin's use. The film structure must have the strength to enable the used napkins to be removed from the napkin belt by stripping the used napkin pressure sensitive adhesive layer from the belts. The sanitary napkin belt has a planar thin plastic sheet or strap area to which the napkin can be adhesively secured and adjusted in the correct anatomical position.

The high wet strength ply 10 and 69 may also have a paper base with a thin plastic coating laminated to the paper, typically a paper base 0.004–0.007 inch thick and a plastic coating 0.0005–0.002 thick. The paper face may be cemented to the felt ply area 6 or the like, the cement becoming an integral part of the bond layer 12.

It is preferred to use a hot melt, solvent free adhesive composition for adhesive layers areas 9 and 68 to adhere the dry sponge volume 2 or 63 or the like. The hot melt adhesive should have a softening temperature range well above the standard body temperature of 98.6° F., such as 100° F. or more.

Obviously many modifications and variations in this sanitary napkin may be made in the light of these teachings. It is therefore understood that within the scope of the appended claims, the invention may be practiced otherwise than as specifically described.

I claim:

1. A menstrual sanitary napkin comprising: a dry, regenerated cellulose, fine pore, planar sponge volume having planar major and minor axes, said sponge volume dimensionally compressed normal to the planar face of said volume minimizing pore size openings, and forming a planar compressed sponge ply area; a cellulosic, fibrous, non-woven felted ply area having larger major and minor axes than said major and minor axes of said planar compressed sponge ply area, said felted ply area located adjacently parallel to and coaxial with the central major axis of the sponge volume planar area; a thin, menstrual fluid resistant adhesive layer area plied between and bonding one face of said planar compressed sponge ply area and a first face of said felted play area, aforesaid adhesive layer covering only a minor area of said planar compressed sponge area; a thin menstrual fluid impermeable, high wet-strength ply area, equal in area and adjacently located parallel to a second face of said felted ply area, a contiguous bond layer plied between said second face of said felted ply area and a first face of said high wet-strength ply area; a thin pressure sensitive adhesive layer area, centrally located along the major axis of the second face of said high wet-strength ply area, a first face of said pressure sensitive adhesive layer area covering a minor area of said second face of said high wet-strength ply area; and a release coated thin flexible sheet area completely covering the second face of said thin pressure sensitive adhesive layer area, the release coat of said thin flexible sheet contiguous said second face of said thin pressure sensitive adhesive layer area.

2. In the sanitary napkin of claim 1 the modification wherein the thin, menstrual fluid resistant adhesive layer area is formed by a hot melt, solvent free adhesive composition whose softening temperature range is above 100° F.

3. In the sanitary napkin of claim 1 the modification wherein the dry, regenerated cellulose, fine pore, planar sponge volume is planarly elliptical shaped.

4. In the sanitary napkin of claim 1 the modification wherein the center of the major and minor axes of the planar sponge volume area coincides with center of the major and minor axes of the felt ply area.

5. A menstrual sanitary napkin comprising: a dry, regenerated cellulose, fine pore, elliptical shaped planar sponge volume, having planar major and minor axes, said sponge volume dimensionally compressed normal to the planar face of said volume minimizing pore size openings and forming an elliptical shaped, planar compressed sponge ply area; a cellulosic, fibrous, non-woven felted, elliptical shaped planar ply area having major and minor axes greater than said elliptical shaped, planar compressed sponge ply area, said felted ply area located adjacently parallel to and coaxial with the central major axis of said elliptical shaped, planar compressed sponge ply area; a menstrual fluid resistant, thin adhesive layer area plied between and bonding a first face of aforesaid planar sponge ply area and a first face of aforesaid felted ply area, said adhesive layer area covering a minor area portion of said first face of aforesaid planar sponge ply area; a menstrual fluid impermeable, thin flexible, thermoplastic film ply area, equal in area to said felt ply area and bonded on the first face of said film ply area to the second face of aforesaid felt ply area; a thin pressure sensitive adhesive layer area, centrally located along the major axis of the second face of said film ply area, the first face of said pressure sensitive layer area covering a minor area of said second face of said film ply area; and a release coated thin flexible sheet area completely covering the second face of said pressure sensitive adhesive layer area, the release coat of said thin flexible sheet contiguous said second face of said pressure sensitive adhesive layer area.

6. In the sanitary napkin of claim 5 the modification wherein the thin, menstrual fluid resistant adhesive layer area is formed by a hot melt, solvent free adhesive composition whose softening temperature range is above 100° F.

7. In the sanitary napkin of claim 5 the modification wherein the intersection of the major and minor axes of the elliptical shaped sponge volume planar area coincides with the intersection of the major and minor axes of the felt ply area.

References Cited

UNITED STATES PATENTS

| | | | |
|---|---|---|---|
| 2,295,016 | 9/1942 | Scribner | 128—290 |
| 2,731,014 | 1/1956 | Hollingsworth | 128—290 |
| 2,896,627 | 7/1959 | Harwood | 128—290 |
| 3,371,667 | 3/1968 | Morse | 128—296 X |
| 3,406,689 | 10/1968 | Hicks et al. | 128—290 |

ANTON O. OECHSLE, Primary Examiner.

T. ZACK, Assistant Examiner.

U.S. Cl. X.R.

128—296